United States Patent [19]

Arakawa

[11] Patent Number: 4,572,813

[45] Date of Patent: Feb. 25, 1986

[54] PROCESS FOR PREPARING FINE CARBON FIBERS IN A GASEOUS PHASE REACTION

[75] Inventor: Kohei Arakawa, Tokyo, Japan

[73] Assignee: Nikkiso Co., Ltd., Tokyo, Japan

[21] Appl. No.: 638,941

[22] Filed: Aug. 8, 1984

[30] Foreign Application Priority Data

Sep. 6, 1983 [JP] Japan .................. 58-162606
Mar. 1, 1984 [JP] Japan .................... 59-37246
Apr. 19, 1984 [JP] Japan .................... 59-77506

[51] Int. Cl.$^4$ ............................... D01F 9/12
[52] U.S. Cl. ..................... 264/29.2; 264/81; 423/447.3; 423/448; 423/458
[58] Field of Search ............. 264/29.2, 82, 83, 81; 423/447.3, 458, 448, 447.2

[56] References Cited

U.S. PATENT DOCUMENTS

| | | | |
|---|---|---|---|
| 2,796,331 | 6/1957 | Kauffman et al. | 423/447.3 |
| 2,957,756 | 10/1960 | Bacon | 423/447.2 |
| 3,375,308 | 3/1968 | Turkat | 264/29.2 |
| 3,378,345 | 4/1968 | Bourdeau et al. | 423/447.3 |
| 3,580,731 | 5/1971 | Milewski et al. | 264/29.2 |
| 3,664,813 | 5/1972 | Hollander, Jr. | 423/448 |
| 3,900,540 | 8/1975 | Robba et al. | 264/81 |
| 4,014,980 | 3/1977 | Fujimaki et al. | 423/447.3 |
| 4,391,787 | 7/1983 | Tibbetts | 423/458 |

FOREIGN PATENT DOCUMENTS

| | | | |
|---|---|---|---|
| 41-12091 | 7/1966 | Japan | 423/447.3 |
| 49-63732 | 6/1974 | Japan | 423/447.3 |

Primary Examiner—Jeffery Thurlow

[57] ABSTRACT

A process of preparing carbon fibers in a floating state by reacting a mixed gas consisted of a gas of organic metal compound or compounds, a carrier gas and desirably a gas of carbon compound or compounds at the elevated temperature of 600° to 1300° C. is disclosed, in which the fine carbon fibers having a diameter of 0.05 to 2 μm, a length of 2 to 3000 μm and an aspect ratio of 2 to 30,000 as well as a high degree of preferred orientation of carbon layers may be produced in a high yield and a high productivity.

9 Claims, 3 Drawing Figures

PROCESS FOR PREPARING FINE CARBON FIBERS IN A GASEOUS PHASE REACTION

FIELD OF THE INVENTION

This invention relates to a process of preparing fine carbon fibers in a gaseous phase reaction.

BACKGROUND OF THE INVENTION

Carbon fiber produced in a gaseous phase is known to have a high degree of preferred orientation of carbon layers, as well as excellent properties of high strength, high modulus and high corrosion resistance. Further, the carbon fiber has a graphite structure of substantially single crystal through heat treatment, thereby to form an ideal interlaminar compound, which is characterized by high conductivity comparable to copper or alminium and by good performance in, for example, occlusion of hydrogen and thus is potential as a functional material. As for mechanical properties, such carbon fiber has much higher performance than PAN (polyacrylonitrile)-based carbon fibers and pitch-based carbon fibers and thus can be an ideal structural material.

Heretofore, the carbon fiber according to a gaseous phase process has been produced by sequential steps of placing in an electric furnace a substrate of alumina or graphite, onto which an ultra-fine particle catalyst of iron, nickel or the like is formed, over which catalyst in turn is introduced a mixed gas consisting of a gas of hydrocarbon, such as benzene, and a carrier gas, such as hydrogen, thereby to decompose the hydrocarbon at the temperature of 1010°–1300° C. to form and grow the carbon fiber on the substrate. A general procedure for forming the ultra-fine particle catalyst on the substrate is to suspend ultra-fine metal particles of about 100 to 300 Å in a volatile liquid, such as alcohol, having low surface tension, and to spray or apply the resulting suspension onto the substrate, which is then dried. Such procedure has several disadvantages as follows: (1) high irregularity of fiber length on account of temperature differences with resulting uneven fiber length and of ununiform spray of catalyst with resulting coarseness and closeness of the fiber formation, (2) as a gas of organic compound as a carbon source is consumed by reaction, there occurs a difference in a concentration of the organic compound between an inlet and an outlet to the reactor, so that sizes of the resulting fibers may vary in the vicinity of the inlet or the outlet, (3) as the carbon fiber is formed only on the surface of the substrate but the central zone of the reactor is not involved in the reaction, resulting in a poor yield, and (4) independent and separate processes, such as dispersion of the ultra-fine particles onto the substrate, placement of said substrate within a furnace, reduction of oxidized metal particles with hydrogen at the elevated temperature, formation of carbon fibers on the substrate through thermal decomposition of the organic compound, decrease of the furnace temperature, and removal of the carbon fibers, are required, so that continuous production is difficult and thus the productivity is low. Consequently, the production cost becomes too high to compete with already commercialized PAN-based carbon fibers and pitch-based carbon fibers except for special usage, for example, in the functional material.

It has now been found out that a mixed gas consisting of a gas of organic metal compound or compounds, a carrier gas and desirably a gas of carbon compound or compounds may be reacted at the elevated temperature to form the ultra-fine particle catalyst in a gaseous phase reaction and to produce the carbon fibers continuously and efficiently, instead of forming the ultra-fine particle catalyst of iron or nickel on the substrate as in the conventional process.

Accordingly, an object of the invention is to provide a continuous process for preparing carbon fibers in a gaseous phase reaction, which may solve the problems as described hereinabove and improve the productivity.

SUMMARY OF THE INVENTION

In accordance with the invention, there is provided a continuous process for preparing fine carbon fibers in a gaseous phase reaction, characterized in that a mixed gas consisting of a gas of organic metal compound or compounds, a carrier gas and, if desired, a gas of carbon compound or compounds is reacted at the elevated temperature.

In accordance with the invention, the fine carbon fibers having a diameter of 0.05 to 2 $\mu$m, a length of 2 to 3,000 $\mu$m and an aspect ratio of 2 to 30,000 may be readily produced in a high yield and a high productivity.

Further features of the invention, its natures and various advantages will be more apparent from the following detailed description of the invention given by using the accompanying drawings in which:

BRIEF DESCRIPTION THE DRAWINGS

PREFERRED EMBODIMENTS OF THE INVENTION

Figure 1:
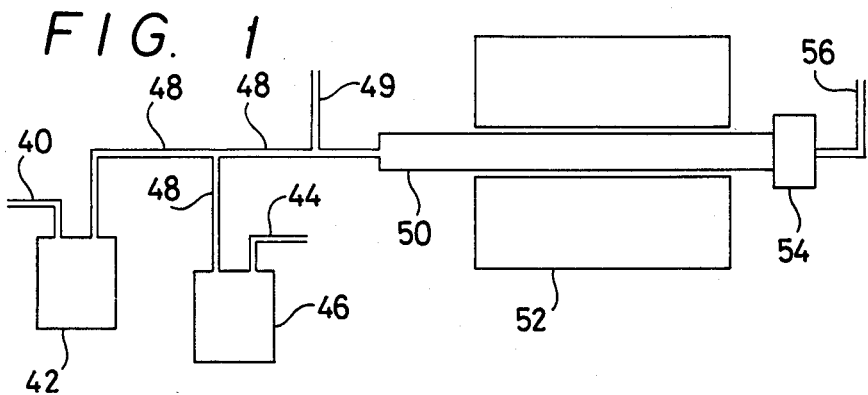
FIG. 1 is a schematic view of an apparatus for practising the process according to the invention.

The process according to the invention is characterized in that a mixed gas consisting of a gas of organic metal compound or compounds and a carrier gas is reacted at the elevated temperature. Desirably, a mixed gas consisting of a gas of organic metal compound or compounds, a gas of carbon compound or compounds and a carrier gas is reacted at the elevated temperature.

The organic metal compound which may be used in the invention includes all types of metal-containing organic compounds, especially those containing transition-metal. The latter may be usually classified into the following types: (1) alkyl compounds, (2) aryl compounds, (3) olefin compounds, (4) sandwich compounds, (5) carbonyl compounds, (6) cyanides, (7) isocyanides, (8) acetylides and others. The term "transition metal" as referred herein, is intended to include scandium, titanium, vanadium, chromium, manganese, iron, cobalt, nickel, yttrium, zirconium, niobium, molybdenum, ruthenium, rhodium palladium, tantalum, tungsten, rhenium, iridium and platinum with the Group VIII metals such as iron, cobalt and nickel being preferred due to their effective catalytic function, especially iron having the highest catalytic function. Among others, the organic metal compound consisting only of carbon, hydrogen and metal is most preferred. A great number of such organic metal compounds may be used in accordance with the invention and representative compounds may be listed as follows: $(C_4H_9)_4Ti$, $(CH_3)_3Re$, $CH_2CHCH_2Mn(CO)_5$,

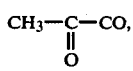

$(CH_3O)_5Ta$, $(C(C_2H_5)_2FeB\gamma.(C_2H_5)FeB\gamma_2$, $(C_6H_5)_3PtI$, $(C_5H_5)_2C\gamma$, $(C_5H_5)_2Ti$, $(C_5H_5)_2Fe$, $(C_6H_6)_2Mo$, $(C_9H_7)_2Fe$, $(C_5H_5)_2Mn$, $(C_5H_5)_2V$, $[C_5H_5Fe(CO)_2]_2$, $[C_5H_5Fe(CO)_2]CN$, $Ni(C_5H_5)_2$,

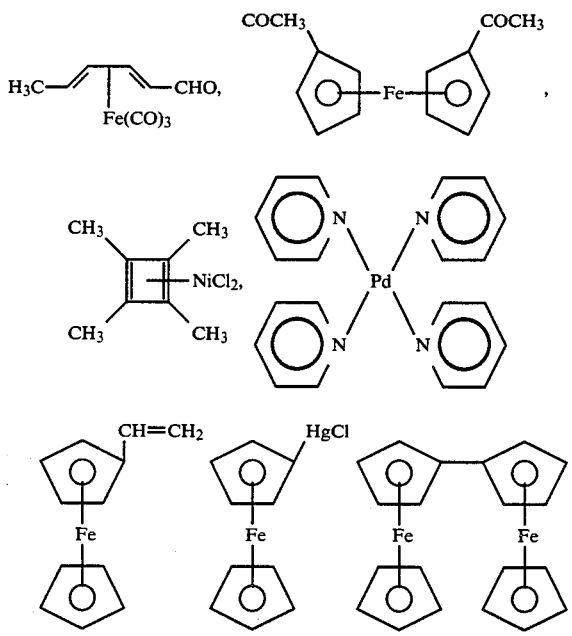

$Fe(CO)_5$, $Fe_2(CO)_9$, $Fe(CO)_2(NO)_2$, iron tetracarbonyl, iron carbonyl halide, iron pentacyanocarbonyl, $Ni(CO)_4$, $Cr(CO)_6$, $Mo(CO)_6$, $W(CO)_6$, and others. Further, a mixture of these compounds may be used.

The carrier gas which may be used in the invention includes all kinds of gases which are inert to or not involved in the reaction, such as $H_2$, $N_2$, He, Ar, Kr, Ne, $CO_2$ and the like. These gases may be used in the form of a mixture or may contain 0–20 % of any other gas such as $H_2S$, $H_2O$, halogen and so on. Sulfurous compound, such as $H_2S$ gas is particularly effective but not limited thereto. Halogen or $H_2O$ may also be contained in the carrier gas.

In the preferred embodiment of the invention, the carbon compound is used as a carbon source, comprising all types of organic compounds including organic chain compounds and organic cyclic compounds. Any compound, such as CO other than the organic compounds may be used in the invention, provided that such compound may serve as a carbon source. As examples of the effective carbon compound in the invention, there may be mentioned the following compounds: alkanes, such as methane and ethane; alkenes, such as ethylene and butadiene; alkynes, such as acetylene; aryl hydrocarbons, such as benzene, toluene and styrene; aromatic hydrocarbons containing fused ring, such as indene, naphthalene and phenanthrene; cyclo-paraffinic hydrocarbons, such as cyclopropane and cyclohexane; cycloolefins, such as cyclopentene and cyclohexene; cycloaliphatic hydrocarbons having fused ring, such as steroids; sulfur-containing aliphatic compounds, such as methylthiol, methylethylsulfide and dimethylthioketone; sulfur-containing aromatic compounds, such as phenylthiol and diphenylsulfide; heterocyclic compounds, such as benzothiophene, thiophene and others. A mixture of these compounds may also be used. Further, a material made of petroleum, such as naphtha, gasoline, kerosene and natural gas are inexpensive and thus may be utilized industrially and effectively. In accordance with the invention, the carbon compound is used only as the carbon source, so that any other element than carbon in the compound is not critical. Thus, the carbon compound may contain nitrogen, oxygen, sulfur, fluorine, chlorine, bromine, iodine, phosphorus, arsenic and other elements.

Upon practising the process of the invention, the mixed gas consisting of the gas of organic metal compound and the carrier gas is reacted at the elevated temperature of 600°–1300° C., preferably 1000°–1200° C. In the modified but more preferable process of the invention, the mixed gas consisting of the gas of organic metal compound, the gas of carbon compound and the carrier gas is reacted at the elevated temperature of 600°–1300° C., preferably 1000°–1200° C. The latter modified process is, however, more effective industrially in view of the yield and economy than the former.

A procedure for preparing the mixed gas is not critical but one example for the modified process (including the carbon compound) will be described hereinbelow. If the orgaic metal compound and the carbon compound are in a gaseous state, then they may be mixed as such. If in the solid or liquid state, each of these compound is charged separately in each heating vessel, to which the carrier gas is introduced separately to form a mixed gas consisting of the gas of carbon compound and the carrier gas on one hand, and another mixed gas consisting of the gas of organic metal compound and the carrier gas on the other hand. Then, both mixed gases are further mixed to form the final mixed gas containing the above-mentioned three gases, namely the gas of organic metal compound, the gas of carbon compound and the carrier gas. In this case, the vaporized or sublimed compounds must be prevented from being recondensed by heating lines for the gases. Alternatively, a solution of the carbon compound having dissolved the organic metal compound therein may be vaporized to form a mixed gas consisting of the gases of the organic metal compound and the carbon compound having the same composition as the starting solution on the elemental basis. In this alternative procedure, the carrier gas may be incorporated either before or after the mixed gas of the organic metal compound and the carbon compound is formed. This alternative procedure is more preferred in view of an apparatus to be employed and stability of the gas concentration than the procedure in which the organic metal compound and the carbon compound are individually and separately vaporized or sublimed and then mixed together, because in the latter case each of the organic metal compound and the carbon compound is liable to vary in its vaporizing degree depending on its residual quantity.

In accordance with the invention, a proportion of the gas of organic metal compound in the total mixed gas should be determined in such a way that an imaginary vapor pressure, assuming that the organic metal compound is decomposed in the heating zone and all metal exists in the atom state, is more than 10 times higher than the saturated vapor pressure of said metal. In order to increase the yield, however, the proportion of the gas of organic metal compound in the total mixed gas is preferably in the range of 0.01 to 40% when the organic metal compound molecule contains one metal atom.

The optimum concentration (by volume) of the carbon compound in the mixed gas may be varied depending on the number of carbon atoms in the compound and on the condition of thermal decomposition, but may be preferably in the range of 0.5-40%.

The carrier gas, when used as a single component gas, may be most preferably $H_2$ gas in view of the yield and productivity, which may be, however, mixed with other gas(es) for further improving the yield. For example, the $H_2$ gas may be mixed with 1-6 % of $H_2S$ gas. Further, gases such as He, Ar, Kr, Ne, $N_2$, or $CO_2$, which itself may be used as the carrier gas, may be incorporated in the amount of 3-20% for further increasing the yield. It should be noted herein that there may occur somewhat difference in the morphology of the resulting carbon fibers depending on gases to be mixed. In case of a mixture of $H_2$ with $H_2S$, the resulting carbon fibers may be relatively rigid and straight, while a mixture of $H_2$ with He, Ar, Kr, Ne, $N_2$, $CO_2$ or the like may provide mostly curved and/or somewhat vermicular fibers. In both cases, however, graphitization treatment above 2800° C. may eliminate the difference substantially.

In accordance with the invention, the mixed gas may be continuously introduced into a reactor tube and the resulting carbon fibers generated in gaseous phase may be continuously withdrawn from its outlet with a mixture gas between a carrier gas and an unreacted gas. In other words, the resulting fibers are fine and thus fall down at a very slow rate, so that very few of them are retained in the reactor tube. In this case, vertical arrangement of the heater may substantially eliminate the accumulation of the fibers within the reactor tube, and enables the fibers to be continuously withdrawn from the tube. The conventional seeding process using the ultra-fine particles on the substrate can utilize only a surface of the substrate as a reaction zone, whereas the process according to the invention enables the ultra-fine metal particles generated by condensation to float or suspend in the whole space within the reactor tube wherein the reaction may proceed in the possible temperature range, thereby to improve the yield considerably. Further, in accordance with the invention it has been found that the concentration of hydrocarbons may be increased in comparison with the seeding process. Thus, due to the continuous production, the improved yield and the availability of the high yield concentration of the hydrocarbons, the process according to the invention may provide the yield more than 100 times higher than the conventional seeding process. Furthermore, in accordance with the invention, the superior fine carbon fibers may be readily obtained in high yield and thus with high productivity, the fine carbon fibers having a diameter of 0.05 to 2 $\mu$m, a length of 2 to 3000 $\mu$m and an aspect ratio of 2 to 30,000, as well as a high degree of preferred orientation of carbon layers. The length of the carbon fibers produced by the process according to the invention is proportional to the retention time within the reaction zone. Thus, the longer reaction zone may provide the fibers of more than 3000 $\mu$m. On the other hand, growth in the diameter may proceed more rapidly than that in the length at the temperature above about 1100° C., so that the temperature gradient within the furnace or the serial connection of furnaces having different temperature ranges may provide the carbon fibers having the diameter of more than 2 $\mu$m. The fine carbon fibers prepared by the process according to the invention have a number of merits as a composite material or a functional material, compared with the long and thick fibers.

The performance required for the short fibers in the composite material is as follows:

(1) high strength and modulus of the fiber itself, (2) high aspect ratio of the fiber, (3) large surface area per unit volume, namely fine form, and (4) low density.

The carbon fibers prepared by the process according to the invention may satisfy all the requirements as described hereinabove and thus may be an ideal material superior to the conventional fibers for preparing the composite material. Also in the functional material, the carbon fibers according to the invention may form an interlaminar compound and thus may be an efficient catalyst for the organic reactions, for which purpose the high specific area of the fibers is advantageous.

The process for preparing the fine carbon fibers in the gaseous phase reaction according to the invention will now be described in detail hereinbelow with reference to the accompanying drawings.

Figure 2:
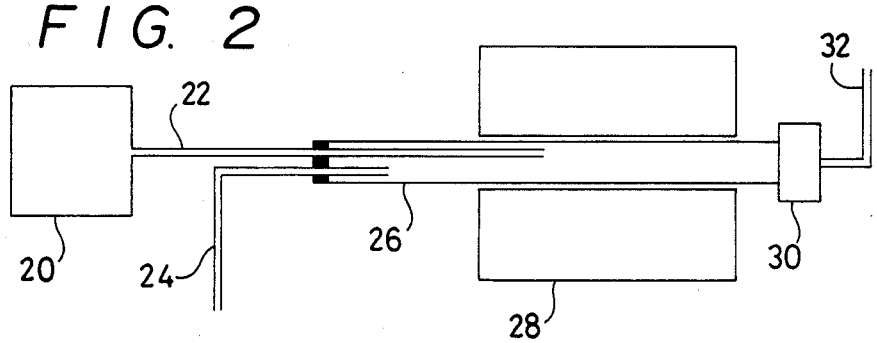
FIG. 2 is a schematic view of another apparatus for practising the modified process according to the invention.

FIGS. 1 and 2 illustrate schematic views of apparatus as used for preparing the carbon fibers in the gaseous phase reaction in accordance with the invention.

Referring to FIG. 1, each of a vaporizer 42 for the organic metal compound and another vaporizer 46 for the carbon compound is connected to pipes 40, 44 for introducing the carrier gas. Each vaporizer 42, 46 is provided with a pipe 48 for feeding the mixed gas, which pipe is controlled in temperature for preventing the vapor from recondensing. The feeding pipe 48 is merged in the way with a pipe 49 for introducing a replacing gas or a minor gas and then connected to a reactor tube 50, a temperature of which is controlled by a heater 52. The carbon figbers produced in the reactor 50 may be collected in a fiber-collector 54, while the carrier gas and the unreacted gases are removed through a pipe 56.

Referring to FIG. 2, an apparatus 20 for feeding a solution, which serves also to store the carbon compound having dissolved the organic metal compound therein, is connected to a pipe 22 for feeding the mixed solution, which pipe 22 is connected together with a pipe 24 for the carrier gas to a reactor tube 26. The feeding pipe 22 for the mixed solution is controlled in temperature for preventing the solution from vaporizing on the way and inserted into the reactor 26 at its temperature range for allowing the solution leaving the pipe 22 to be vaporized instantly. The reactor tube 26 may be controlled in temperature by a heater 28. The carbon fibers produced in the reactor 26 may be collected in a fiber collector 30, while the carrier gas and the unreacted gases are removed through a pipe 32.

Figure 3:
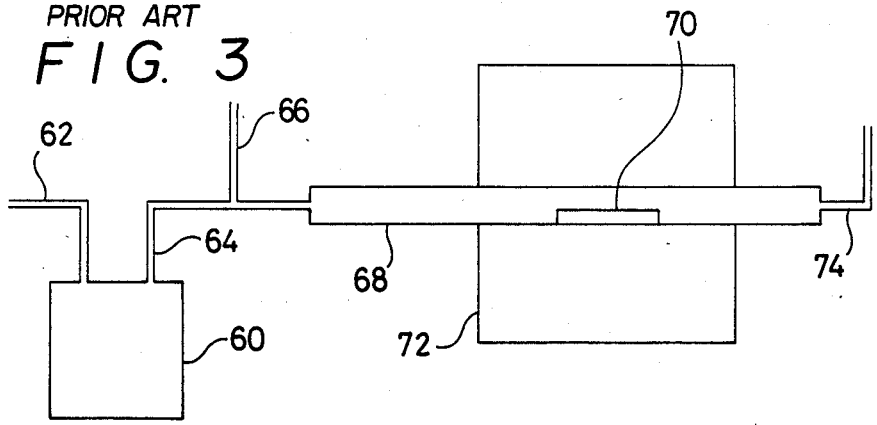
FIG. 3 is a schematic view of a general apparatus for preparing the carbon fibers in the conventional gaseous method.

FIG. 3 shows a general apparatus for preparing the carbon fibers in the well-known seeding process. To a vaporizer 60 for the carbon compound are connected a pipe 62 for feeding the carrier gas and a pipe 64 for withdrawing the mixed gas which latter pipe 64 is merged on the way with a pipe 66 for the replacing or reducing gas and then connected to a reactor tube 68 which is controlled for its temperature by a heater 72. In the reactor tube 68 is placed a substrate 70, on which the unltra-fine metal particles are seeded. The carrier gas and the unreacted gases are removed through a vent pipe 74.

The process for preparing the carbon fibers in the gaseous phase reaction according to the invention will now be described by non-limiting examples and with reference to the drawings.

EXAMPLE 1

FIG. 1 shows an apparatus as used in this Example, in which $(C_5H_5)_2Fe$(ferrocene) as the organic metal compound, $C_6H_6$(benzene) as the carbon compound and $H_2$ gas containing 3% $H_2S$ as the carrier gas were used. The reactor tube having an inner diameter of 50 mm and a length of 1500 mm was made of aluminium oxide, while the heater having an effective length of 900 mm and a uniformly heating zone of about 300 mm was employed.

At first, $(C_5H_5)_2Fe$ and $C_6H_6$ were charged in the vaporizer 42 and 46, respectively. Then, $N_2$ gas was supplied through the pipe 49 into the reactor tube at the flow rate of 500 ml/min., while the temperature of the heater 52 was elevated. After the temperature reached the predetermined level, the $H_2$ gas was fed through the pipe 49 to the reactor tube at the flow rate of 500 ml/min. for replacing the gas. After 30 minutes of the replacement, the $H_2$ gas was introduced into the pipes 40, 44 for the carrier gas, into which pipes was then introduced $H_2S$ gas through the pipe 49. The mixed gas immediately before entering the reactor had the composition of $H_2:H_2S:(C_5H_5)_2Fe: C_6H_5 = 85.0:2.5:0.7:11.8$. Its total flow rate was 588 ml/min., calculated in the standard condition. The uniformly heating zone had the temperature of 1095° C. The resulting carbon fibers were collected in a stainless fiber packed bed filter 54 as the fiber collector. The experiment was continued for 30 minutes for measuring a deposited amount of the carbon fibers on the reactor tube and on the stainless filter. 3.5 g of fine carbon fibers was obtained, which contained little carbon black and had a diameter of 0.2 $\mu$m and a length of about 30 $\mu$m in average.

Reference 1

FIG. 3 shows an apparatus as used in this experiment, in which the heater 72 and the reactor tube 68 are identical to those in Example 1. The vaporizer 60 was charged with $C_6H_6$ liquid. The reactor tube at its center was provided with a half-circle substrate which was prepared by splitting an aluminium oxide pipe of ID 45 mm and 300 mm length into half. The substrate had previously been subjected to the following treatment. About 1 g of ultra-fine iron particles having an average particle size of 100 Å was suspended in 1000 ml of alcohol, and then supernatant liquid was taken to be sprayed on the surface of the substrate and then dried.

At first, $N_2$ gas was fed through the pipe 66 at the flow rate of 500 ml/min. while the temperature of the heater 72 was elevated. After the temperature reached the predetermined level, the pipe 66 was supplied with $H_2$ gas instead of the $N_2$ at the same flow rate of 500 ml/min. After 30 minutes of the gas replacement, the pipe 66 was closed and the $H_2$ gas was fed through the pipe 62 for the carrier gas at the flow rate of 100 ml/min. The gas composition in the withdrawal pipe 64 represents $H_2:C_6H_6 = 97.6:2.4$, while the total flow rate was 102.5 ml/min. The experiment was continued for 4 hours at the temperature of 1090° C. for the first one hour, 1130° C. for the next one hour and 1180° C. for the last two hours. After the heater was cooled, the substrate was removed to find that the carbon fibers of 7 $\mu$m diameter and about 3 cm length were formed on the surface of the substrate. Then, the carbon fibers were scraped off from the substrate and measured for the weight to find 0.32 g. This experiment was chosen from more than 100 experiments due to its highest yield and productivity. Notwithstanding, it will be appreciated that the result of Example 1 is 88 times higher in its productivity than this experiment. This figure of 88 times represents the comparison upon growth phase of the carbon fibers. Thus, on the premise that the procedure of Example 1 ensures the continuous production whereas the reference (the well-known process) does not allow the continuous operation, the productivity may be readily increased over the figure of 88 times up to more than 100 times.

EXAMPLE 2 to 11

These Examples were carried out using the same apparatus as in Example 1 to obtain the results as shown in Table 1 below.

TABLE 1

| | Ex. No. | | | | | | | | | |
|---|---|---|---|---|---|---|---|---|---|---|
| | 2 | 3 | 4 | 5 | 6 | 7 | 8 | 9 | 10 | 11 |
| Heater temperature, °C. | 1070 | 1050 | 1100 | 1080 | 1040 | 1095 | 1095 | 1080 | 1110 | 1060 |
| Gas total flow rate, ml/min. | 434 | 1030 | 326 | 624 | 721 | 573 | 573 | 970 | 681 | 672 |
| Carrier gas | $H_2$ | $H_2:Ar = 1:1$ | $H_2$ | $H_2:He = 9:1$ | $N_2$ | $H_2$ | $H_2:N_2 = 9:1$ | $N_2$ | Ar | $H_2$ |
| Carrier gas volume, % | 89.8 | 85.8 | 74.6 | 86.6 | 80.6 | 87.2 | 87.2 | 68.8 | 84.2 | 94.1 |
| Carbon Compound | — | $C_3H_8$ | $CH_4$ | $C_6H_6$ | $C_2H_5OH$ | $C_6H_6$ | $C_6H_6$ | $C_2H_2$ | $C_3H_8$ | $C_8H_6S$ |
| Carbon Compound volume % | — | 12.2 | 24.3 | 13.1 | 15.2 | 12.1 | 12.1 | 29.0 | 15.3 | 5.7 |
| Org. metal Compound | $(C_9H_7)_2Fe$ | $Cr(CO)_6$ | $Fe(CO_5)$ | $(C_5H_5)_2Ni$ | $(C_6H_6)_2Mo$ | $(C_5H_5)_2Fe$ | $(C_5H_5)_2Fe$ | $(C_5H_5)_2Fe$ | $Ni(CO)_4$ | vinyl-ferrocene |
| Org. metal Compound | 10.2 | 2.0 | 1.1 | 0.3 | 4.2 | 0.7 | 0.7 | 2.2 | 0.5 | 0.2 |
| Running time, min. | 60 | 30 | 50 | 30 | 30 | 30 | 30 | 60 | 30 | 30 |
| Carbon yield, g | 3.7 (90% carbon | 1.5 (99% carbon | 1.9 (90% carbon | 4.2 (95% carbon | 2.1 (99% carbon | 1.8 (100% carbon | 3.2 (100% carbon | 2.5 (80% carbon | 2.8 (98.1% carbon | 2.7 (100% carbon |

TABLE 1-continued

| | Ex. No. | | | | | | | | |
|---|---|---|---|---|---|---|---|---|---|
| 2 | 3 | 4 | 5 | 6 | 7 | 8 | 9 | 10 | 11 |
| black) | black) | fibers) | black) | black) | fibers) | fibers) | black) | black) | fibers |

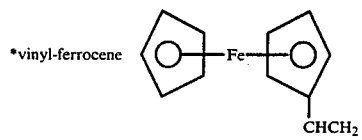

*vinyl-ferrocene

As shown in Examples 1 to 11, it is preferred to use the mixed gas consisting of predominant $H_2$ gas as the carrier gas. When sulfurous compound is used as the organic compound, even the use of the $H_2$ gas as the carrier gas may provide the high yield of the carbon fibers.

EXAMPLE 12

An apparatus as used in this Example is shown in FIG. 2. The apparatus 20 for feeding the sooution, which is also served as a storage, was charge with a solution having dissolved therein one mole of $(C_5H_5)_2Fe$ per Kg of Cphd $6H_6$. Then, the $C_6H_6/(C_5H_5)_2Fe$ solution was continuously fed at the flow rate of 0.1 g/min. by constant flow rate pump to the aluminum reactor tube of 50 mm ID heated to 1090° C. and was vaporized instantly in the reactor. On the other hand, $H_2$ gas was fed through the pipe 24 for the carrier gas to the reactor tube at the flow rate of 670 ml/min. The experiment was continued for one hour to determine the yield of the carbon fibers collected in the reactor tube and the stainless fiber filter 30. Further, similar experiments were repeated ten times to evaluate stability of the productivity. The result is shown in Tables 2 and 3 below.

Reference 2

The same apparatus as used in Example 1 was employed and the condition was established to obtain the same gas composition as in Example 12. Thus, one hour experiments were repeated ten times to obtain the results as shown in Tables 2 and 3.

TABLE 2

| | Yield | |
|---|---|---|
| Run | Example 12 | Reference 2 |
| 1 | 1.6 g | 1.3 g |
| 2 | 1.4 g | 1.4 g |
| 3 | 1.4 g | 1.1 g |
| 4 | 1.3 g | 1.2 g |
| 5 | 1.5 g | 0.9 g |
| 6 | 1.3 g | 1.6 g |
| 7 | 1.6 g | 0.8 g |
| 8 | 1.4 g | 1.3 g |
| 9 | 1.2 g | 1.0 g |
| 10 | 1.3 g | 1.4 g |

Statistical analysis was carried out for the experimental data as shown in Table 2 to obtain the result which is shown in Table 3 below.

TABLE 3

| | Example 12 | Reference 2 |
|---|---|---|
| Average Yield ($\overline{X}$) | 1.4 | 1.2 |
| Sum of Squares (S) | 0.16 | 0.56 |
| Standard Deviation ($\sigma n-1$) | 0.133 | 0.249 |
| Coefficient of Variation (CV) | 9.5 | 20.8 |

In Table 3, $\overline{X} = \Sigma xi/n$, $$\sigma n - 1 = \sqrt{\frac{\Sigma(xi - \overline{x})^2}{n - 1}}$$

$$CV = \frac{\sigma n - 1}{\overline{x}} \times 100$$

$$S = \Sigma xi^2 - \frac{(\Sigma xi)^2}{n}$$

xi: yield (g) on number i
n: number of exp. (10)

It will be appreciated from the data in Table 3 that variance analysis (on one side) with 5% significant level shows clear significant difference in variance between Example 12 and Reference 2. As a result, it may be concluded with 5% significant level that the yield in Example 12 is more stable.

Although the invention has been described hereinabove with its preferred embodiments, the invention is not limited thereto and many variations and modifications may be made without departing from the spirit and scope of the invention.

What is claimed is:

1. In a process for preparing fine carbon fibers in a gaseous phase reaction, the improvement consisting in that a gas mixture consisting of a gas of organic metal compound or compounds and a carrier gas is subjected to elevated temperatures, said organic metal compound at said elevated temperatures decomposing to form a metal catalyst which induces growth of carbon fibers in a floating state, and continuously recovering the carbon fibers.

2. A process for preparing fine carbon fibers in a gaseous phase reaction, characterized in that a gas mixture, consisting of a gas of organic metal compound or compounds, a gas of carbon compound and a carrier gas, is subjected to elevated temperatures, said organic metal compound decomposing when subjected to said elevated temperatures to form a catalyst which induces growth of carbon fibers in a floating state, and continuously recovering the carbon fibers.

3. A process according to claim 1 or 2, wherein the organic metal compound contains Fe, Co and/or Ni.

4. A process according to claim 1 or 2, wherein the organic metal compound consists only of carbon, hydrogen and iron.

5. A process according to claim 1 or 2, wherein the carrier gas is a mixed gas containing more than 60% of $H_2$ gas.

6. A process according to claim 1 or 2, wherein the carrier gas is $H_2$ gas containing 1 to 5% of $H_2S$.

7. A process according to claim 1 or 2, wherein the carrier gas is $H_2$ gas containing 3 to 20% of other gas selected from He, Ar, Kr, Ne, $N_2$, and $CO_2$.

8. A process according to claim 2, wherein a solution of the carbon compound having dissolved the organic metal compound or compounds therein is vaporized to form a mixed gas of the carbon compound with the organic metal compound or compounds having the same composition as said solution on the elemental basis.

9. A process according to claim 1 or 2, wherein the mixed gas is reacted at the temperature of 600° to 1300° C.

* * * * *